Feb. 27, 1968 J. W. SCHWARTZENBERG ETAL 3,371,199

POLAR COORDINATE CONVERTER

Filed Nov. 7, 1963

United States Patent Office 3,371,199

Patented Feb. 27, 1968

3,371,199

POLAR COORDINATE CONVERTER

John W. Schwartzenberg, Maple Glen, and Duncan K. Foley, Ambler, Pa., assignors to Leeds & Northrup Company, a corporation of Pennsylvania Filed Nov. 7, 1963, Ser. No. 322,141
4 Claims. (Cl. 235—189)

Figures 1, 1A:
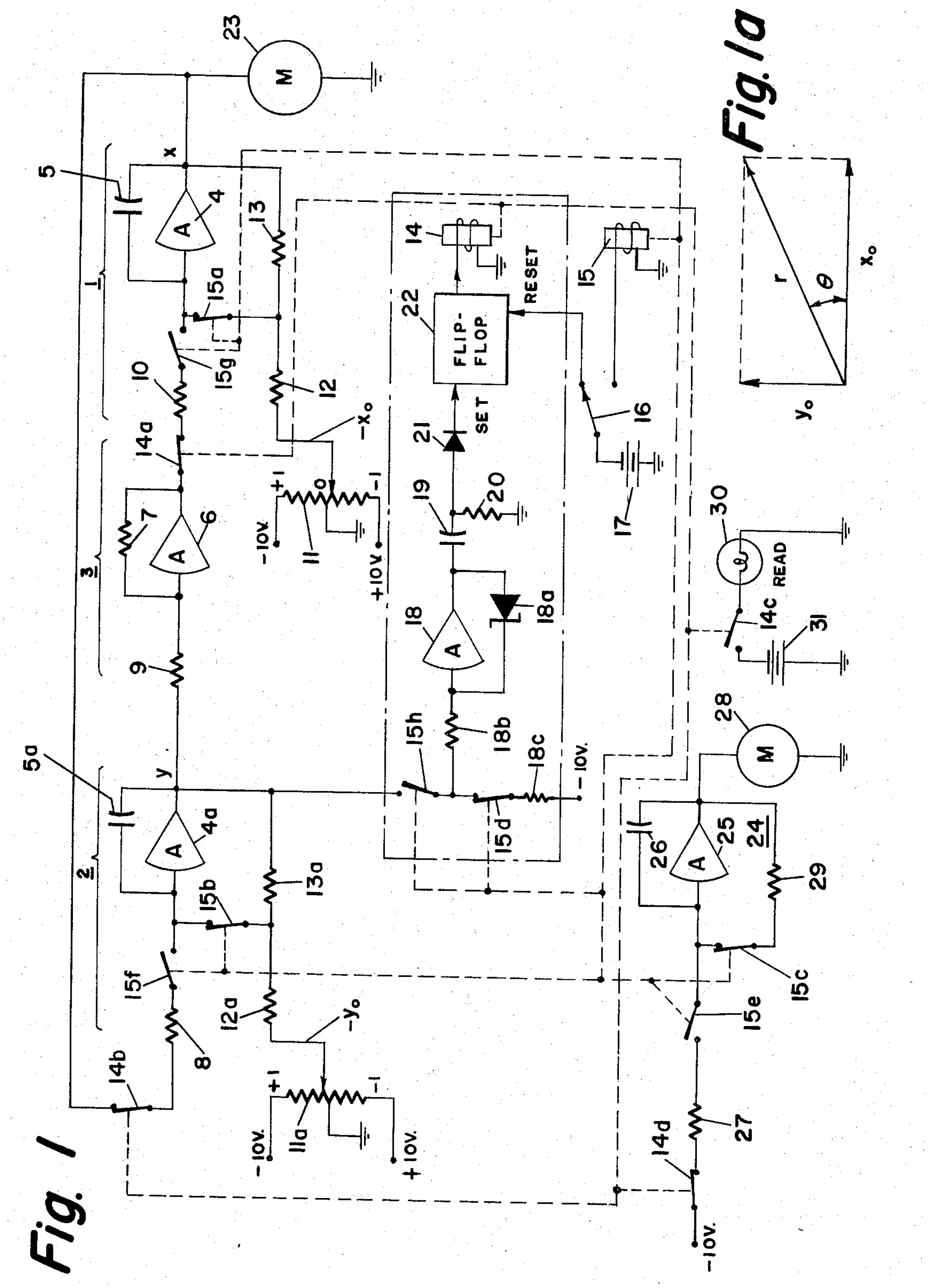

This invention relates to systems for converting data from rectangular to polar coordinates and, more particularly, relates to a polar coordinate converter utilizing only standard linear analog computer elements. Such systems are sometimes referred to as inverse resolvers.

It is frequently necessary to transform data from rectangular coordinates, i.e. an ordinate and an abscissa, to polar coordinates, i.e., a radius vector and a polar or direction angle. One example of a situation in which this is necessary is in the measurement of the frequency response of a process by means of analog correlation techniques. In this situation, the response of the process is obtained in terms of the real and imaginary parts, abscissa and ordinate, of the frequency response function, rather than the more easily used polar coordinates of radius vector and polar angle. Therefore, it is necessary to convert the rectangular coordinates to polar coordinates.

Prior art systems for accomplishing this have not been completely satisfactory. Most commonly, prior art systems have accomplished coordinate transformation by using non-linear resolvers of the sine-cosine potentiometer type or of the AC rotatable transformer type. A description of these conventional methods can be found in Korn and Korn, Electronic Analog Computers, second edition, McGraw-Hill, 1956, pages 329–338.

Accordingly, an important object of the present invention is the provision of a system using linear computing elements and a simple switching comparator to perform polar coordinate transformations.

In carrying out the invention in accordance with one embodiment thereof, a loop circuit including two integrators and a phase reversing amplifier is provided. Voltages proportional to the rectangular coordinates to be transformed, $x_0$ and $y_0$, are first respectively applied as initial condition inputs to the two integrators. This loop circuit then provides the standard analog computer solution for a second order undamped differential equation wherein the output of one integrator is proportional to:

(1) $$x=x_0 \cos \omega t+y_0 \sin \omega t$$

and wherein the output of the other integrator is proportional to:

(2) $$y=x_0 \sin \omega t+y_0 \cos \omega t$$

where $t$ denotes time in seconds after energization of the loop circuit, and where $\omega$ denotes the natural frequency of the equations in radians/second.

It will be recognized that the output of one integrator is equal to the projection of a rotating radius vector on the $x$ axis of the rectangular coordinates while the output of the other integrator is equal to the projection of the same rotating radius vector on the $y$ axis of the rectangular coordinates.

In accordance with the present invention, after a time interval during which the proper initial condition voltages are applied to the integrators, this loop circuit is energized to initiate the interaction between the two integrators and is deenergized at a particular time at which the output of one of the integrators is proportional to the radius vector.

More particularly, after the initiation or energization of the integrators, the outputs of the two integrators change with time in accordance with equations (1) and (2) above. The loop circuit is deenergized, i.e. the integration by the integrators is stopped, at a time T, which is selected so that the output of one integrator is 0; $y(T)=0$, and the rate of change of this integrator is negative; i.e.

$$\frac{dy}{dt}<0$$

It will subsequently be shown that at this time the output of one of the integrators is proportional to the radius vector of the polar coordinates corresponding to the rectangular coordinates specified by $x_0$ and $y_0$.

Further in accordance with this invention, a third integrator provides an indication of the time interval between the energization of the loop circuit and the deenergization at time T. This time interval is proportional to the polar angle $\theta$ of the polar coordinate transformation. After the application of a zero initial condition voltage, a constant input voltage is applied to this integrator upon energization of the loop circuit. This constant voltage is disconnected from the input to the integrator at the selected time T at which the loop circuit is deenergized. It will be shown that at this time the output of the integrator is proportional to the polar angle of the polar coordinate transformation of the rectangular coordinates $x_0$ and $y_0$. In this manner, the magnitude of the radius vector and the polar angle have been obtained quickly and by means of linear integrators and amplifiers and a switching comparator which selects the time T at which the loop circuit is to be deenergized.

The foregoing and further objects, features and advantages of the present invention will be better understood from the following more detailed description, in conjunction with the drawings in which:

FIG. 1 shows a preferred circuit for carrying out the invention, and

FIG. 1*a* shows a vector diagram of rectangular coordinates and the corresponding polar coordinate.

Referring now to FIG. 1 there is shown a loop circuit including integrators 1 and 2 and phase reversing amplifier 3. As is conventional, the integrator 1 includes a high gain inverting type DC amplifier 4, a negative feedback capacitor 5 connected between the output and the input thereof, and an input resistor 10 connected to the input or summing junction by relay contacts **15*g*. The integrator 2 includes similar components 4*a*, 5*a*, 8 and 15*f*. The reversing amplifier 3 includes a high gain DC amplifier 6 having a negative feedback resistor 7, and input resistor 9**, which are of equal value.

Integrators 1 and 2 and phase reversing amplifier 3 are connected in a loop circuit by means of a plurality of relay contacts to be subsequently described. The loop is such that when energized, the output of integrator 1 is applied to the input of integrator 2; the output of integrator 2 is applied to the input of the phase reversing amplifier, and the output of the phase reversing amplifier is applied to the input of integrator 1.

In order to set the initial conditions for integrator 1, a potentiometer 11 connected between −10 volts and +10 volts is provided. A voltage proportional to $x_0$, but of opposite polarity, is developed on the slider of this potentiometer by proper adjustment of the potentiometer. This voltage $-x_0$ is applied through an initial condition network including resistors 12 and 13 and a pair of relay contacts **15*a* to the summing junction of integrator 1. This network insures that the output of integrator 1 is proportional to $x_0$ initially. With the contacts 15*a* closed, the voltage output from the amplifier 4** is a positive DC voltage of magnitude equal to $x_0$.

In order to set the initial condition of integrator 2, an initial condition network including slidewire **11*a*, resistors 12*a* and 13*a* and contacts 15*b* is provided. This network performs a function for integrator 2 similar to that just described for integrator 1. The potentiometer 11***a* is set initially to a position so that a negative voltage proportional to $-y_0$ is developed on the slider and an equal positive voltage is developed at the output of amplifier 4*a*.

In order to energize the loop circuit and deenergize the loop circuit at a predetermined time, relays 14 and 15 are provided. There are three operating modes for the loop and the modes are determined by relays 14 and 15. The three modes are: Initial Condition, Conversion and Hold. In the Initial Condition mode the values of the rectangular coordinates to be converted are appplied as initial starting levels for the integrators 1 and 2. In the Conversion mode the loop circuit is completed or energized for the conversion operation. In the Hold mode the loop circuit is opened or deenergized and the integrators hold their outputs at the levels existing when the loop was deenergized.

The Initial Condition relay 15, referred to as the IC relay, permits setting the initial conditions of the integrators 1 and 2. Relay 15 has associated therewith the contacts 15*a* and 15*b*, which are normally closed to connect the initial condition voltages $x_0$ and $y_0$ to integrators 1 and 2, respectively. When the IC relay 15 is energized by moving a switch 16 to its downward position, thereby connecting voltage source 17 to the relay, the normally closed contacts 15*a* and 15*b* are opened, thereby disconnecting the initial condition voltages from integrators 1 and 2. The IC relay 15 also actuates the normally closed contacts 15*c* and 15*d*, and the normally open contacts 15*e*, 15*f*, 15*g* and 15*h* as indicated by the dashed line extending from the IC relay 15 to these contacts. The function of these contacts will be subsequently explained.

The Hold relay 14, referred to as the H relay, is used to deenergize the loop circuit, and hold the results of the integration up to a predetermined time. The relay 14 actuates the normally closed contacts 14*a* and 14*b* which interrupt the loop circuit when the relay 14 is energized. Also actuated by the relay 14 are the normally open contacts 14*c* and the normally closed contacts 14*d*. The function of these contacts will be subsequently described.

In order to detect the time T at which $y$, the output of integrator 2, is equal to 0, and $$\frac{dy}{dt}<0$$

a comparator circuit shown within the dashed lines is provided. The output of integrator 2 is applied through relay contacts 15*h* to the input of the comparator which will be subsequently described in detail. When the condition $y=0$, $$\frac{dy}{dt}<0$$

occurs, a positive pulse is applied through diode 21 to the set input to flip flop 22. When flip flop 22 is set by such a pulse, the relay 14 is energized. It should be noted that flip flop 22 is reset when the switch 16 is moved to its upward position, as shown.

When the loop circuit is deenergized at time T by actuation of contacts 14*a* and 14*b*, the output of integrator 1 is proportional to the radius vector of the polar coordinate transformation of the rectangular coordinates $x_0$ and $y_0$. In order to measure this voltage, a meter 23 is provided.

In order to obtain an indication of the polar angle it is necessary to determine the time that elapses between the energization and subsequent deenergization of the loop circuit. An integrator 24 is provided to determine this time. As is conventional, this integrator includes a high gain DC amplifier 25 and a feedback capacitor 26 connected between the input and the output of the amplifier. An initial condition of zero volts is applied to this integrator by the action of the initial condition network composed of feedback resistor 29 and the relay contact

15*c* connected to the summing junction of the integrator. When the loop circuit is energized, $-10$ volts is simultaneously applied through relay contact 14*d*, input resistor 27 and relay contacts 15*e* to the integrator 24. At time T this circuit is broken because the relay contacts 14*d* are opened. At this time the output of integrator 24 is proportional to the elapsed time T and to the polar angle of the polar coordinate transformation of the rectangular coordinates $x_0$, $y_0$. In order to measure this voltage, a meter 28 is provided.

In order to provide an indication that the time T has passed and the meters 23 and 28 should be read, an indicator lamp 30 is provided. At time T the normally open relay contacts 14*c* are closed, thereby connecting the voltage source 31 to the indicator lamp, which, when lit, indicates that meters 23 and 28 show the results of the conversion.

The operation of the circuit in performing the polar coordinate transformation is as follows: It is desired to convert the rectangular coordinates $x_0$ and $y_0$ into polar coordinates. Referring to FIG. 1*a* the rectangular coordinates specified by the ordinate $y_0$ and the abscissa $x_0$ can be expressed in polar coordinate form by the radius vector $r$ and the polar angle $\theta$. In order to do this with the circuit shown in FIG. 1, the potentiometer 11 is initially set by means of the calibrated scale on the potentiometer, so that a voltage of magnitude proportional to $-x_0$ is developed on the slider and the potentiometer 11*a* is set so that a voltage of magnitude proportional to $-y_0$ is developed on the slider.

The switch 16 is set in its upper position, thereby resetting the flip flop 22. The H relay 14 and the IC relay 15 are both deenergized. The contacts 15*a* and 15*b* are closed, thereby applying the initial condition voltages $-x_0$ and $-y_0$ to the integrators 1 and 2, respectively. The normally open IC relay contacts 15*f* and 15*g* are open; therefore, the loop circuit is deenergized.

In order to intiate the conversion, i.e. energize the loop circuit, the switch 16 is moved to its lowermost position, thereby energizing the IC relay 15. Relay 15 closes contacts 15*f* and 15*g*, thereby completing the loop circuit. Simultaneously, contacts 15*a* and 15*b* are opened, thereby disconnecting the initial condition networks from the summing junctions of integrators 1 and 2.

When the IC relay 15 is energized, the normally closed contact 15*c* is opened, removing the initial condition network from the summing junction of integrator 24 and the contact 15*e* is closed, thereby completing a circuit from $-10$ volts, through contact 14*d*, input resistor 27, contacts 15*e* to integrator 24. Therefore, the integrator 24 begins an integration of a constant voltage.

The energization of the IC relay 15 also actuates the relays 15*d* and 15*h*. This applies the $y$ voltage output from integrator 2 to the circuit which detects when the $y$ voltage crosses through 0 from positive to negative. This zero crossing detection circuit is composed of the high gain inverting DC amplifier 18, Zener diode 18*a*, input resistor 18*b*, bias resistor 18*c*, differentiating capacitor 19, resistor 20 and diode 21.

When initial conditions are being applied to the integrators 1, 2 and 24, a negative bias voltage is applied to amplifier 18 through resistors 18*b* and 18*c* and relay contact 15*d*. The action of this bias voltage is to drive the output of amplifier 18 in a positive direction. However, since the Zener diode 18*a* conducts in the forward direction, the output voltage from amplifier 18 is limited at near zero volts. When the IC relay is energized to begin the conversion, the bias voltage is removed and the $y$ voltage is applied to amplifier 18 through relay contact 15*h*. When the $y$ voltage becomes positive, either because $y$ is positive when 15*h* closes or changes from negative to positive due to normal variations of $y$ with the loop energized, the output of amplifier 18 quickly goes negative to about $-10$ volts, which is the Zener voltage of diode 18*a*. This negative step in the output of amplifier 18 causes a negative pulse to pass through the R–C differentiator including resistor 20 and capacitor 19. However, the presence of diode 21 prevents the pulse from being passed on the flip flop 22. The decay time constant of this differentiator is selected to be relatively fast so that the pulse quickly decays to zero voltage. When the voltage $y$ again crosses through zero volts, but now in a direction from positive to negative, the output of amplifier 18 quickly goes from $-10$ to 0 volts, causing a positive pulse to be produced at the output of the differentiator. This positive pulse is conducted through diode 21 and causes the flip flop 22 to energize the H relay and deenergize the loop.

Recapitulating the operation of the circuit thus far, the IC relay 15 has been energized, thereby energizing the loop circuit initiating the conversion. The IC relay has also completed a circuit which applies a constant voltage to the integrator 24, so that this integrator is producing at its output a voltage proportional to the time integral of a constant. Finally, the IC relay has completed a circuit which applies the $y$ voltage to the circuitry which will detect the occurrence of the time T at which voltage $y$ crosses through 0 from positive to negative.

When the $y$ voltage output of integrator 2 crosses 0 from positive to negative, the flip flop 22 is set. This flip flop then energizes the H relay 14. When this occurs, the loop circuit is deenergized by reason of the opening of the relay contacts **14*a* and 14*b*. The circuit is then in the Hold mold. The integration of a constant by integrator 24 is terminated at this time by reason of the opening of relay contacts 14*d*. Finally, the relay contacts 14*c* are closed, thereby applying a voltage to indicator lamp 30, which indicates that the meters 23 and 28 may be read. At this time, the meter 23 will indicate a voltage proportional to the radius vector of the polar coordinate transformation of $x_0$, $y_0$ and the meter 28** will indicate a voltage proportional to the polar angle of the polar coordinate transformation of the rectangular coordinates $x_0$, $y_0$.

There will now be provided a mathematical explanation of the reasons why the meter 23 indicates the radius vector and the meter 28 indicates the polar angle at time T.

Referring again to the loop circuit including the integrators 1 and 2 and the phase reversing amplifier 3, we have assumed the output of integrator 1 to be $x$ and the output of integrator 2 to be $y$. Since the output of integrator 2 is $y$, the input must be equal to $$-\frac{1}{\omega}\frac{dy}{dt}$$

where $\omega$ is the reciprocal of the integration time constant. The integrator time constant is given by the product of the input resistor in megohms and the feedback capacitor in microfarads. The $-$ sign is present due to the inherent sign change present in the integrator. Since the output of integrator 1, $x$, is applied to the input to integrator 2, then $$\frac{dy}{dt}=-\omega x$$

Similarly, since the output of integrator 2, $y$, is reversed in sign and applied to the input to integrator 1 and since the input to integrator 1 must be $$-\frac{1}{\omega}\frac{dx}{dt}$$

then the following equation must be valid:

$$\frac{dx}{dt}=+\omega y$$

The above set of first order differential equations defines a second order undamped system. The solution of these equations is given by:

$$x=x_0 \cos \omega t+y_0 \sin \omega t \qquad (1)$$

$$y=-x_0 \sin \omega t+y_0 \cos \omega t \qquad (2)$$

where $y_0$ and $x_0$ are the initial conditions placed on the integrators 1 and 2 before the conversion begins.

The integration is stopped at a time T which is selected so that a time, T, $y=0$ and $dt/dt$ is negative. Inserting the condition $y=0$ at time T into Equation 2, the following result is obtained:

$$0=-x_0 \sin \omega T+y_0 \cos \omega T \qquad (3)$$

Rearranging the above, the following is obtained:

$$\frac{y_0=\sin \omega T}{x_0 \cos \omega T}=\tan \omega T \qquad (3a)$$

From Equation 3*a* above, it can be seen that $$\frac{x_0}{\sqrt{x^2{}_0+y^2{}_0}}=\cos \omega t \qquad (4)$$

$$\frac{y_0}{\sqrt{x^2{}_0+y^2{}_0}}=\sin \omega T \qquad (5)$$

Substituting Equations 4 and 5 into Equation 1 we then obtain $$x(T)\sqrt{x^2{}_0+y^2{}_0} \qquad (6)$$

The expression $$\sqrt{x^2{}_0+y^2{}_0}$$

will instantly be recognized as the radius vector $r$ of the polar coordinate transformations of the rectangular coordinate $x_0$, $y_0$. Therefore, at time T, the output of integrator 1 is proportioned to the radius vector.

The output of integrator 24 is given by the simple relationship $$z(T)=\omega\int_0^T dt=\omega T \qquad (7)$$

where $z(T)$ is the output of integrator 24 at time T. We may substitute this into Equation (3*a*) and obtain $$\frac{y_0}{x_0}=\tan \omega T=\tan z(T) \qquad (7a)$$

or $$z(T)=\tan^{-1}\frac{y_0}{x_0} \qquad (8)$$

Equation 8 states that the output of integrator 24 at time T is equal to the angle the tangent of which is $y_0/x_0$. This angle is the polar angle of the polar coordinate transformation. The second condition $$\frac{dy}{dt}<0$$

is selected to remove the uncertainty arising with angles between 180° and 360° due to the relation $$\theta=\tan\ (\theta+180°)$$

Thus we see from Equations (6) and (8) that at time T, the voltages on meters 23 and 28 will represent the radius vector and polar angle corresponding to the rectangular coordinates $x_0$ and $y_0$.

In an application of the invention the following typical values were used.

| | | |
|---|---|---|
| Amplifiers: | | |
| **4, 4*a*** | Electronic Associate | |
| **6, 18, 24** | Model 6.282 | |
| Capacitors: | | |
| **5** | microfarads | 10 |
| **10*a*** | do | 10 |
| **19** | do | 5 |
| **26** | do | 10 |
| Resistors: | | |
| **7** | K ohms | 10 |
| **8** | do | 100 |
| **9** | do | 10 |
| **10** | do | 100 |
| **11** | ohms | 100 |
| **11*a*** | do | 100 |

Resistors:

| | | |
|---|---|---|
| 12 | K ohms | 10 |
| 13 | do | 10 |
| 18b | do | 1 |
| 18c | do | 100 |
| 20 | do | 27 |
| 27 | do | 628 |
| 29 | do | 10 |
| Zener diode 18a | | Hoffman 1N1315 |
| Diode 21 | | Transitron S669G |

The above values provide a system in which the radius vector meter 23 has a scale factor of 10 volts equal to one unit and polar angle meter 28 has a scale factor of 10 volts equal to 360°. The above values provide a revolution time of 6.28 seconds for 360°, i.e. one complete revolution of the rotating radius vector. Different conversion times can be obtained by appropriate changes in the magnitudes of the circuit parameters.

Certain modifications of the invention may be made without departing from the principles of the invention. As an example while the potentiometers 11 and 11*a* have been shown in FIG. 1 for setting the initial condition quadrature components on the integrators 1 and 2, other means may be used to establish these conditions. When the invention is used to convert the outputs from a correlation analyzer such as shown in IEEE Transactions Paper 63–19 "An Experimental Correlation Analyzer for Measuring System Dynamics," by Ross and Goff, the integrators 1 and 2 may also serve as the output integrators of the analyzer and would thus obtain their initial condition values as a result of the integration performed in conjunction with the analyzer operation. The integrators would subsequently be connected in the loop circuit configuration for conversion.

It will be understood that various other modifications may be made without departing from the principles of the invention. The appended claims are, therefore, intended to cover any such modifications within the true spirit and scope of the invention.

What is claimed is:

1. An inverse resolver for converting a pair of inputs representative of two rectangular coordinate components of a radius vector into an output signal representative of the magnitude of said radius vector comprising means for producing two time varying output signals respectively representative of the varying rectangular components of a rotating vector signal of constant amplitude, means for presetting said first-named means to initial conditions representative of positive or negative values of the two coordinate components of a radius vector of unknown magnitude, means for energizing said first-named means for producing said time-varying output signals after presetting means has been preset, means responsive to one of said output signals for deenergizing said first-named means when said one of said output signals is zero and when the rate of change of said one of said outputs is less than zero, and means responsive to the other of said output signals to provide a signal representative of the magnitude of the radius vector represented by said initial conditions.

2. The resolver recited in claim 1 further including timing means for measuring the time interval between the energization and the deenergization of said first-named means, the output of said timing means being proportional to the polar angle.

3. A system for converting signals representative of two coordinates, $x_0$ and $y_0$, in a rectangular coordinate system to signals representative of the equivalent polar coordinates comprising loop circuit means, means for energizing said loop circuit, said loop circuit including:

a first integrator producing a first output proportional to $x=x_0 \cos \omega t+y_0 \sin \omega t$ and a second integrator producing a second output proportional to $y=-x_0 \sin \omega t+y_0 \cos \omega t$, where $x$ and $y$ are dependent variables, $t$ denotes time after energization of said loop circuit, and $\omega$ is the angular frequency of the rotating vector, and a phase reversing amplifier, said second output being applied to the input of said phase reversing amplifier, a first voltage source producing a first voltage adjustable through negative and positive voltage ranges to be proportional to $x_0$, means for applying said first voltage to the input to said first integrator prior to energization of said loop circuit, a second voltage source producing a second voltage adjustable through negative and positive voltage ranges to be proportional to $y_0$, means for applying said second voltage to the input to said second integrator prior to energization of said loop circuit, means for applying said first output to the input of said second integrator upon energization of said loop circuit, means for applying the output of said phase reversing amplifier to the input of said first integrator upon energization of said loop circuit, means connected to said second output for deenergizing said loop circuit when said second output is zero and the rate of change of said second output is less than zero, said first output being proportional to the radius vector of said polar coordinates at the time said loop circuit is deenergized, and means for measuring the time interval between the energization and the deenergization of said loop circuit, the output of said measuring means being proportional to said polar angle.

4. The system recited in claim 3 wherein said measuring means includes a third integrator, means responsive to said means for energizing said loop circuit for applying a constant input signal to said third integrator, means responsive to said means for deenergizing said loop circuit for disconnecting said constant input signal from said third integrator, the output of said third integrator being proportional to the phase angle of said polar coordinates at the time said loop circuit is denergized.

References Cited

UNITED STATES PATENTS

| | | | |
|---|---|---|---|
| 2,634,909 | 4/1953 | Lehmann | 235—61.5 |
| 2,989,239 | 6/1961 | Bailey | 235—186 |
| 3,180,977 | 4/1965 | Brakel | 235—189 |
| 3,187,169 | 6/1965 | Trammel et al. | 235—189 |

OTHER REFERENCES

Computer Control Company Advertisement, "Model DR14 Digital Resolver," 1 page, published 1962.

MALCOLM A. MORRISON, *Primary Examiner.*

J. F. RUGGIERO, *Assistant Examiner.*

PO-1050
(5/69)

UNITED STATES PATENT OFFICE
CERTIFICATE OF CORRECTION

Patent No. 3,371,199 Dated January 26, 1970

Inventor(s) Duncan K. Foley & John W. Schwartzenberg

It is certified that error appears in the above-identified patent and that said Letters Patent are hereby corrected as shown below:

Col. 6, line 4 "a" should read --at--
"dt/dt" should read --dy/dt--

Col. 6, line 54, the equation should read:
--tan Θ = tan (Θ + 180°)--

SIGNED AND
SEALED
MAY 19 1970

(SEAL)
Attest:

Edward M. Fletcher, Jr.
Attesting Officer

WILLIAM E. SCHUYLER, JR.
Commissioner of Patents